United States Patent [19]

Nakamura

[11] Patent Number: 5,038,905

[45] Date of Patent: Aug. 13, 1991

[54] ELECTROMAGNETIC CLUTCH

[75] Inventor: Hiroaki Nakamura, Ise, Japan

[73] Assignee: Shinko Electric Co., Ltd., Tokyo, Japan

[21] Appl. No.: 403,124

[22] Filed: Sep. 5, 1989

[30] Foreign Application Priority Data

Aug. 5, 1988 [JP] Japan .................................. 63-195352

[51] Int. Cl.$^5$ .................................................. F16D 27/10
[52] U.S. Cl. ................................... 192/84 C; 192/84 R
[58] Field of Search ........................... 192/84 C, 84 R

[56] References Cited

U.S. PATENT DOCUMENTS

| | | | |
|---|---|---|---|
| 1,745,413 | 2/1930 | Forster | 192/84 C |
| 2,488,552 | 11/1949 | Oetzel | |
| 2,490,044 | 12/1949 | Garbarini et al. | 192/84 C |
| 2,703,378 | 3/1955 | Harter | 317/165 |
| 3,016,118 | 1/1962 | Zatsky | 192/18 |
| 3,158,242 | 11/1964 | Binder et al. | 192/84 |
| 3,272,290 | 9/1966 | Goddard | 192/84 C X |
| 3,292,756 | 12/1966 | Stevinson | 192/84 |
| 3,422,942 | 1/1969 | Spencer | 192/84 |
| 4,391,356 | 7/1983 | Takemura et al. | 192/84 C |
| 4,429,773 | 2/1984 | Dohi et al. | 192/84 C X |
| 4,487,174 | 12/1984 | Isozumi | 123/179 |
| 4,508,203 | 4/1985 | Packard et al. | 192/84 C |
| 4,566,574 | 1/1986 | Marshall | 192/84 C |
| 4,664,238 | 5/1987 | Nishino et al. | 192/84 C |
| 4,804,874 | 2/1989 | Nakamura | 310/92 |

FOREIGN PATENT DOCUMENTS

| | | |
|---|---|---|
| 1122908 | 9/1956 | France . |
| 921683 | 6/1961 | United Kingdom . |
| 1129661 | 11/1965 | United Kingdom . |
| 1112175 | 11/1966 | United Kingdom . |

Primary Examiner—Rodney H. Bonck
Attorney, Agent, or Firm—Darby & Darby

[57] ABSTRACT

An electromagnetic clutch includes a rotor, a coil, an armature hub, an armature and a yoke. The rotor has a cylindrical wall extending axially thereof and having one end. The coil is disposed around the cylindrical wall of the rotor. The armature hub is rotatably disposed so as to be coaxial with the rotor. The armature is disposed in opposed relation to the one end of the cylindrical wall of the rotor, and is supported by the armature hub for rotation therewith in such a manner as to be movable toward and away from the one end of the cylindrical wall of the rotor. The yoke is disposed so as to surround the rotor, the coil and the armature. The rotor, the armature and the yoke are arranged to form a magnetic path so that when the coil is energized, the armature is electromagnetically attracted to the rotor for transmitting torque between the rotor and the armature hub. The one end of the cylindrical wall of the rotor serves as a single magnetic pole for forming the above magnetic path.

4 Claims, 3 Drawing Sheets

ELECTROMAGNETIC CLUTCH

BACKGROUND OF THE INVENTION

1. Field of the Invention

The present invention pertains to an electromagnetic clutch and particularly to a microclutch suitable for use in office automation or factory automation equipment.

2. Prior Art

FIG. 1 depicts a conventional electromagnetic microclutch of the aforementioned type. The electromagnetic clutch, generally designated by 1, comprises a hollow cylindrical rotor shaft 2 formed of a synthetic resin by integral molding. The rotor shaft 2 has an annular rotor 3 of a shallow channell-shaped cross-section securely mounted therearound. The rotor 3 has inner and outer circumferential magnetic poles 3a and 3b isolated from each other by through-grooves 3c. An annular yoke 4 of a deep channell-shaped cross-section is rotatably mounted on the rotor shaft 2 so as to be positioned on the left side in FIG. 1 with respect to the rotor 3. The yoke 4 holds a coil 6 therein and has a yoke-locking plate 7 securely fixed thereto. The yoke locking plate 7 is supported by equipment to which the clutch is mounted, and is kept stationary, so that the yoke 4 is prevented from accompanying the rotor shaft 2 when the latter is rotated. A gear 10 rotatably fits around the rotor shaft 2 and is prevented from axial movement by both the boss of the rotor shaft 2 and a retaining ring 11 mounted to the rotor shaft 2. A ring-shaped armature 8 is fixed to the gear 10 through an annular spring plate 9 so that one face thereof faces to the inner and outer magnetic poles 3a and 3b, leaving a small gap.

With such a construction, the armature 8 is rotated together with the gear 10 when a rotation force is transmitted from a motor (not shown) to the gear 10. During the rotation of the armature 8, the coil 6 is energized for magnetizing the yoke 4, so that a magnetic flux passes through the yoke 4, the inner circumferential magnetic pole 3a of the rotor 3, the armature 8, and the outer circumferential magnetic pole 3b, and then returns to the yoke 4, thus forming a magnetic path $\Phi_1$. The armature 8 is hence brought into contact with the rotor 3 by electromagnetic attraction counter to the resilient force exerted by the spring plate 9, so that the rotor shaft 2 and hence an output shaft of the equipment are rotated.

The above-described electromagnetic clutch, however, has a number of problems, including:

(a) It has been difficult to accurately produce the yoke 4 by pressing since its cross-sectional configuration is of a deep channel shape.

(b) The two magnetic poles magnetically isolated from each other must be formed on the rotor 3. Therefore, the manufacture of the conventional electromagnetic clutch has been complicated and expensive.

(c) It has been very difficult to make the gap between the armature 8 and the inner circumferential magnetic pole 3a equal to that between the armature 8 and the outer circumferential magnetic pole 3b. Consequently, one of the gaps becomes larger, and the magnetic flux consumption tends to increase.

(d) Since the coil 6, the rotor 3 and the armature 8 are arranged in line in an axial direction, the resulting clutch is therefore relatively long in the axial direction. This results in unfavorable circumstances when mounting the clutch in equipment.

SUMMARY OF THE INVENTION

It is therefore the object of the present invention to provide an electromagnetic clutch which can be manufactured easily while permitting the use of parts of a simple construction, and which is relatively short in the axial direction.

According to the present invention, there is provided an electromagnetic clutch comprising a rotor having an axis of rotation and including a cylindrical wall extending axially thereof and having one end; a coil disposed around the cylindrical wall of the rotor; an armature hub rotatably disposed so as to be coaxial with the rotor; an armature disposed in opposed relation to the end face of the cylindrical wall of the rotor, the armature being supported by the armature hub for rotation therewith in such a manner as to be movable toward and away from the one end of the cylindrical wall of the rotor; and a yoke disposed so as to surround the rotor, the coil and the armature; the rotor, the armature and the yoke being arranged to form a magnetic path so that when the coil is energized, the armature is electromagnetically attracted to the rotor for transmitting torque between the rotor and the armature hub, the one end of the cylindrical wall of the rotor serving as a single magnetic pole for forming the magnetic path.

DESCRIPTION OF THE PREFERRED EMBODIMENTS OF THE INVENTION

Figure 1:
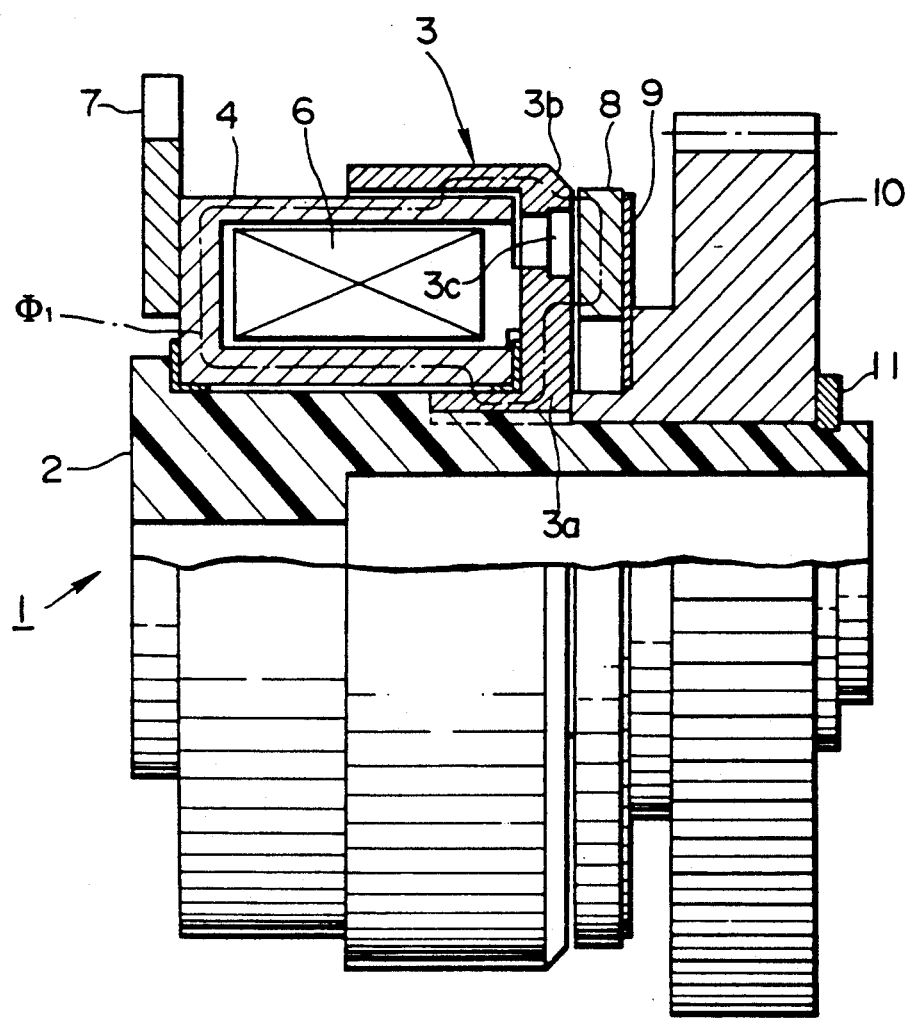
FIG. 1 is a side elevation, partly in radial section, of a conventional electromagnetic clutch.
Figure 2:
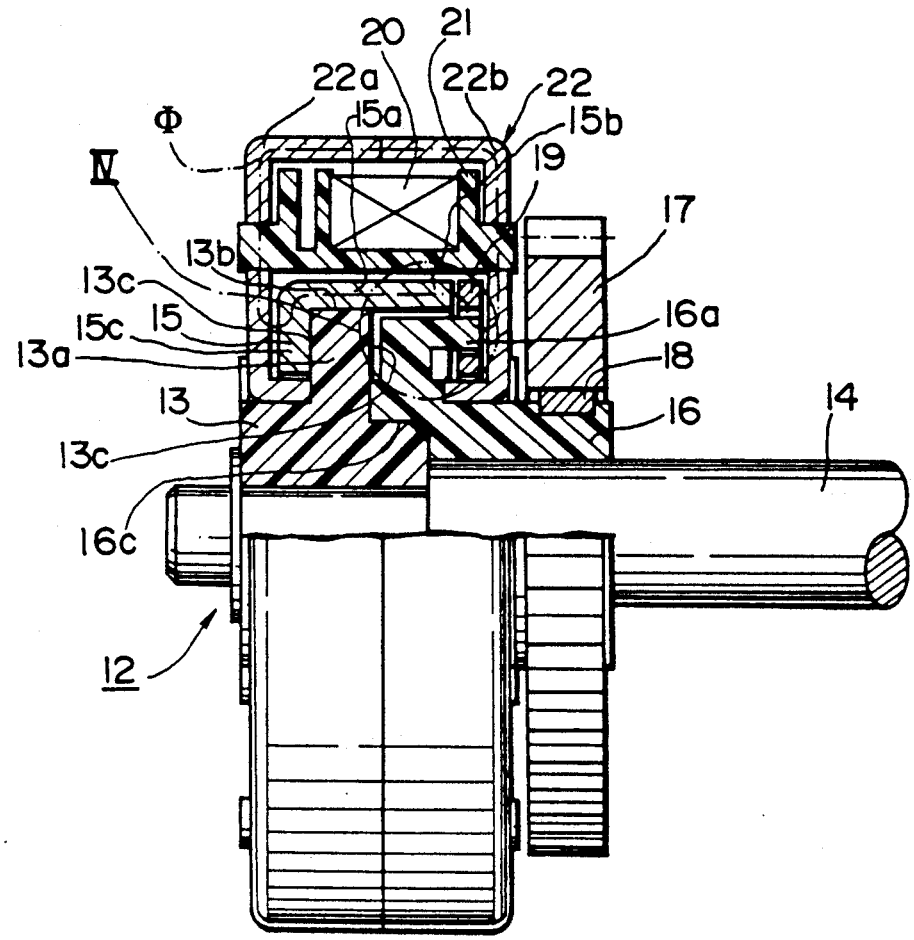
FIG. 2 is a side elevation, partly in radial section, of an electromagnetic clutch in accordance with the present invention.

FIG. 2 depicts an electromagnetic microclutch in accordance with the present invention. The electromagnetic clutch, generally designated by 12, comprises a hollow rotor hub 13 having an axis of rotation and formed of a non-magnetic material such as synthetic resin. The hollow portion of the rotor hub 13 is of a D-shaped cross section, so that the forward end of an output shaft 14 of an appliance can be inserted in and securely fixed to it. The rotor hub 13 has a radially outwardly extending flange portion 13a having an outer peripheral surface 13b and a pair of opposite end surfaces 13c, and an annular rotor 15 of an L-shaped cross-section is securely mounted around the flange portion 13a for rotation therewith. The rotor 15 has a cylindrical wall 15a disposed coaxial with the rotor hub 13 and having a free end 15b and an annular end plate 15c disposed at the other end so as to extend radially inwardly thereof. The rotor 15 is securely fixed to the rotor hub 13 with an inner periphery of the cylindrical wall 15a mated with the outer peripheral surface 13b of the flange portion 13a and with one surface of the end plate 15c mated with one of the opposite end surfaces 13c in such a manner that the free end 15b of the cylindrical wall 15a protrudes from the flange portion 13a of the rotor hub 13.

An armature hub 16 of a non-magnetic material such as synthetic resin is positioned on the right side in FIG. 2 with respect to the rotor hub 13 so as to form a small gap therebetween. The armature hub 16 has a through-hole slightly greater in diameter than the output shaft 14, so that the output shaft 14 is inserted through the hub 16 for rotation relative to the hub 16.

Figure 3:
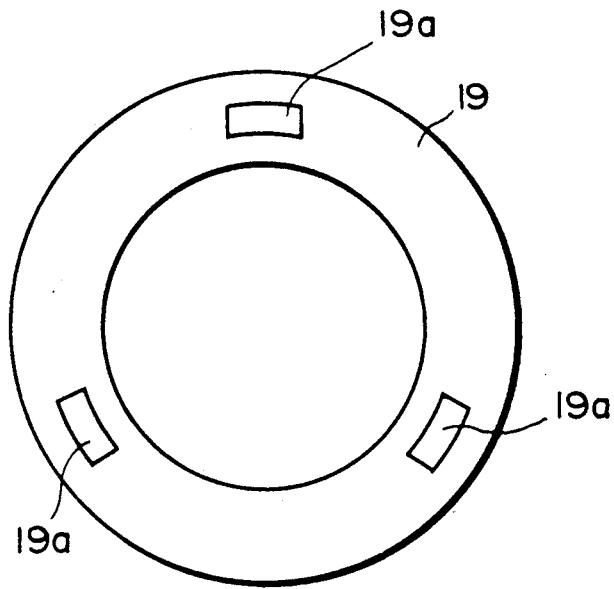
FIG. 3 is a front view of an armature used in the clutch of FIG. 2.
Figure 4:
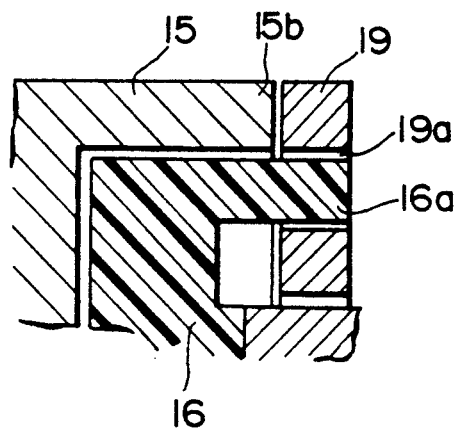
FIG. 4 is an enlarged view of the encircled portion designated by IV in FIG. 2.

A gear 17 is fitted on the armature hub 16 at one end portion thereof and is securely fixed thereto through a key 18. The other end portion of the armature hub 16 has a plurality of (three) arms 16a of an L-shaped cross-section in circumferentially equally spaced relation to one another, one arm portion of each arm extending axially toward the one end of the armature hub 16. Furthermore, the other end portion of the armature hub 16 is provided with a recess 16c in which one end of the rotor hub 13 is loosely fitted. A ring-shaped armature 19, as best shown in FIG. 3, is supported by the armature hub 16 for rotation therewith and for sliding movement in an axial direction. More specifically, the armature 19 is provided with a plurality of (three) apertures 19a formed therethrough and disposed in circumferentially equally spaced relation to one another, and the axially extending portions of the arms 16a of the armature hub 16 are inserted through the apertures 19a of the armature 19 for allowing sliding axial movement of the armature 19 along the arms 16a. The armature 19 is thus disposed in opposed relation to the free end 15b of the rotor 15 with a small gap formed therebetween.

Furthermore, a coil bobbin 21 of a synthetic resin, which has a coil 20 wound therearound, is disposed around the rotor 15, and an annular yoke 22 is disposed so as to surround the rotor 15, the coil bobbin 21 and the armature 19. The yoke 22 is comprised of a pair of yoke members 22a and 22b of a channel-shaped cross-section which are coupled together to define an annular chamber of a larger channel-shaped cross-section opening radially inwardly, and the coil 20, the rotor 15, the flange portion 13a of the rotor hub 13, the armature 19 and the arms 16a of the armature hub 16 are all housed in the chamber so as to be rotatable relative to the yoke 22. As shown in FIG. 2, the yoke member 22a is disposed adjacent to the rotor 15 with a gap formed therebetween while the yoke member 22b is disposed adjacent to the armature 19 with a gap formed therebetween. Furthermore, the coil bobbin 21 is securely fixed to the yoke members 22a and 22b.

With the above construction, when the gear 17 is rotated by a rotation force transmitted from a motor (not shown) the armature hub 16 and hence the armature 19 are rotated. Then, the coil 20 is energized for magnetizing the yoke members 22a and 22b, and the free end 15b of the rotor 15 acts as a single magnetic pole, so that a magnetic flux passes through the yoke member 22a, the end 15a of the rotor 15, the armature 19, and the yoke member 22b, and then returns to the yoke member 22a, thus forming a magnetic path Φ. The armature 19 is then slid through the arms 16a of the armature hub 16 and is brought into contact with the rotor 15 by magnetic attraction, so that the rotor 15 and the rotor hub 13 and hence the output shaft 14 of the equipment are rotated.

In the electromagnetic clutch as described above, since the end 15a of the rotor 15 serves as a single magnetic pole, the construction of the magnetic circuit can be simplified. Therefore, the electromagnetic clutch can be manufactured easily with high precision and at reduced cost. In addition, inasmuch as the rotor 15 and the armature 19 are disposed inside the coil 20, the axial length of the electromagnetic clutch 12 can be reduced substantially, so that the clutch can be easily mounted in any automation equipment.

Figure 5:
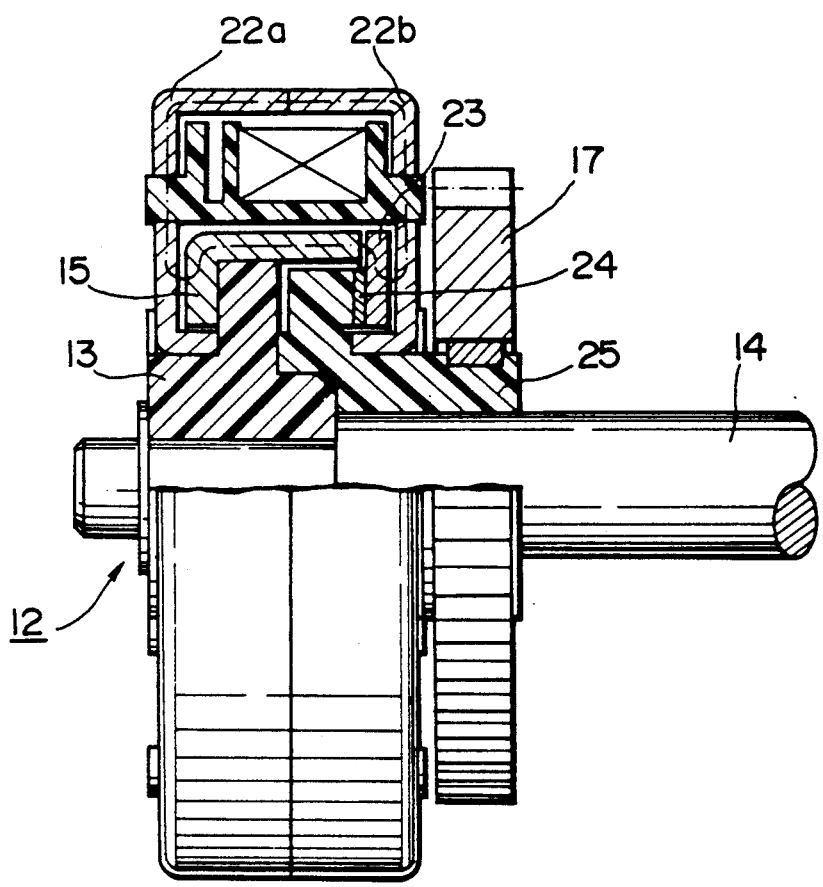
FIG. 5 is a view similar to FIG. 2, but showing a modified clutch in accordance with the invention.

FIG. 5 illustrates a modified electromagnetic clutch 12 in accordance with the invention, which differs from the above embodiment only in that a ring-shaped armature 23 is securely fixed to an armature hub 25 through a resilient member in the form of an annular spring plate 24. The spring plate 24 retains the armature 23 for rotation with the armature hub 25 and resiliently urges the armature 23 away from the end 15b of the cylindrical wall 15a of the rotor 15. This embodiment exhibits the same effect as in the previous embodiment.

While the electromagnetic clutches according to the present invention have been specifically shown and described herein, many modifications are still possible in light of the above teachings. For example, the output shaft 14 of the equipment may be mounted to the armature hub 16, 25 while the gear 17 may be secured to the rotor hub 13.

What is claimed is:

1. An electromagnetic clutch comprising:
   a rotor having an axis of rotation and including a cylindrical wall extending axially thereof and having one end;
   a coil disposed around said cylindrical wall of said rotor;
   an armature hub rotatably disposed so as to be coaxial with said rotor, said armature hub including a plurality of arms extending axially thereof;
   an armature disposed in opposed relation to said one end of said cylindrical wall of said rotor, said armature being supported by said armature hub for rotation therewith in such a manner as to be movable toward and away from said one end of said cylindrical wall of said rotor, said armature including a plurality of apertures formed therethrough, said plurality of arms being inserted through said apertures for allowing said sliding movement of said armature along said arms; and
   a yoke disposed so as to surround said rotor, said coil and said armature, said yoke being comprised of a pair of annular yoke members coupled together to define a chamber in which said coil, said rotor and said armature are housed, one of said yoke members being disposed adjacent to said rotor with a gap formed between said one yoke member and said rotor with a gap formed between said one yoke member and said rotor in an axial direction, while the other yoke member is disposed adjacent to said armature with a gap formed between said other yoke member and said armature in an axial direction; and
   a coil bobbin around which said coil is wound, said bobbin being securely fixed to said yoke;
   said rotor, said armature and said yoke being arranged to form a magnetic path so that when said coil is energized, said armature is electromagnetically attracted to said rotor for transmitting torque between said rotor and said armature hub, said one end of said cylindrical wall of said rotor serving as a single magnetic pole for forming said magnetic path.

2. An electromagnetic clutch according to claim 1, further comprising a rotor hub on which said rotor is securely mounted, said rotor hub and said armature hub being both made of a non-magnetic material.

3. An electromagnetic clutch comprising:
a rotor having an axis of rotation and including a cylindrical wall extending axially thereof and having one end;
a coil disposed around said cylindrical wall of said rotor;
an armature hub rotatably disposed so as to be coaxial with said rotor, said armature hub including a plurality of arms extending axially thereof;
an armature disposed in opposed relation to said one end of said cylindrical wall of said rotor, said armature being supported by said armature hub for rotation therewith and for sliding movement therealong in such a manner as to be movable toward and away from said one end of said cylindrical wall of said rotor, said armature including a plurality of apertures formed therethrough, said plurality of arms being inserted through said apertures for allowing said sliding movement of said armature along said arms; and
a yoke disposed so as to surround said rotor, said coil and said armature;
said rotor, said armature and said yoke being arranged to form a magnetic path so that when said coil is energized, said armature is electromagnetically attracted to said rotor for transmitting torque between said rotor and said armature hub, said one end of said cylindrical wall of said rotor serving as a single magnetic pole for forming said magnetic path.

4. An electromagnetic clutch according to claim 3, further comprising a rotor hub on which said rotor is securely mounted, said rotor hub and said armature hub being both made of a non-magnetic material.

* * * * *